April 4, 1961 J. KONOPKA 2,977,626
FRICTION HINGE
Filed Aug. 6, 1959 2 Sheets-Sheet 2
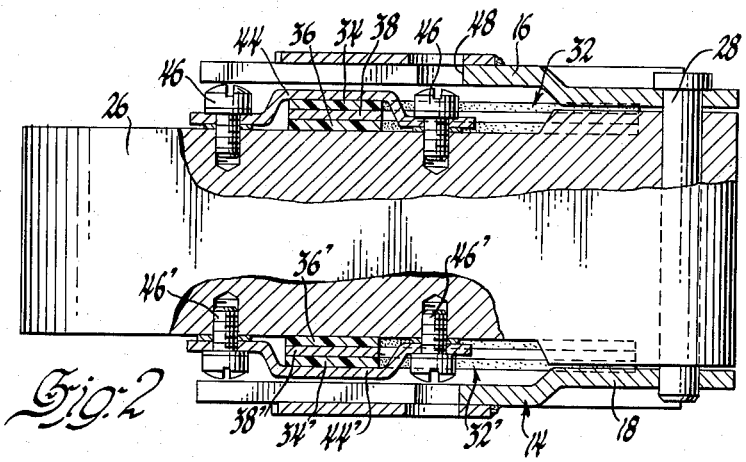
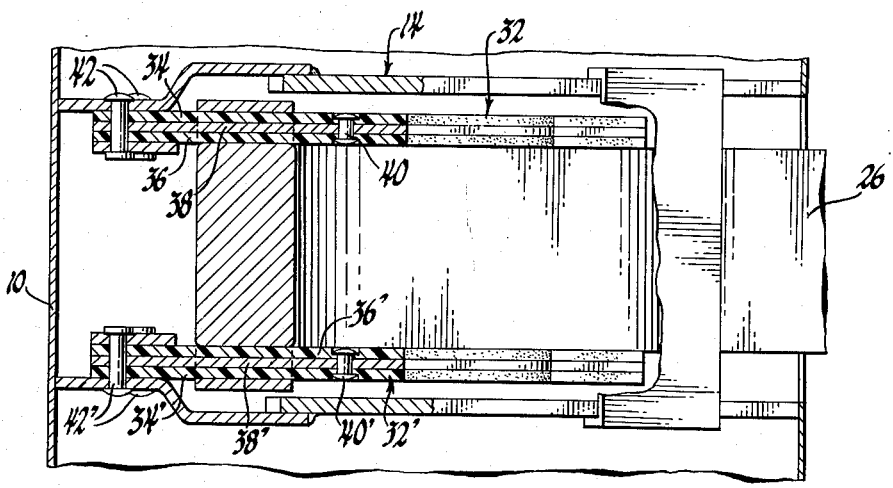
INVENTOR.
Joseph Konopka
BY
W. S. Pettigrew
ATTORNEY

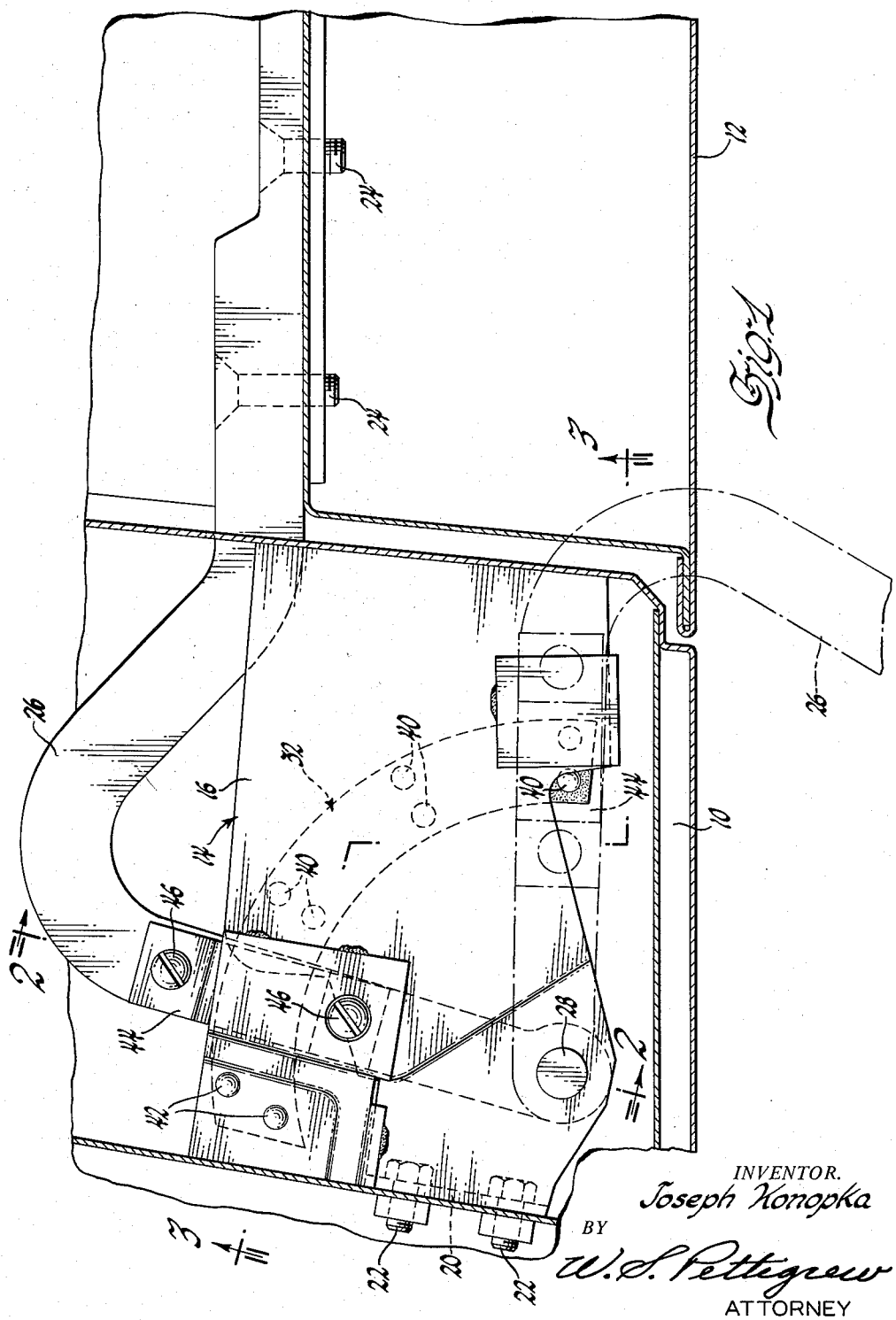

United States Patent Office 2,977,626
Patented Apr. 4, 1961

2,977,626
FRICTION HINGE

Joseph Konopka, Dearborn, Mich., assignor to General Motors Corporation, Detroit, Mich., a corporation of Delaware Filed Aug. 6, 1959, Ser. No. 832,010

4 Claims. (Cl. 16—140)

This invention relates to a hinge, and more particularly to a friction hinge for a vehicle door.

One feature of the invention is that it provides an improved friction hinge; another feature of the invention is that it provides a friction hinge in which the degree of friction is readily adjustable; a further feature of the invention is that it provides a friction hinge in which the frictional operation is obtained through the coefficient of static friction between a material having a low coefficient of friction (as nylon) and the material of the hinge (steel); and still another feature of the invention is that the friction member comprises an elongated strip member which is slidably and frictionally clamped against the edge of the swinging hinge member, the strip member comprising outer laminations of material having a low coefficient of friction, as nylon, and an inner lamination of strong rigid material as steel.

Other features and advantages of the invention will be apparent from the following description and from the drawings, in which:

Fig. 1 is a transverse horizontal section taken through a portion of an automobile body pillar and door and showing the improved hinge, the hinge being shown in door-closed position in solid lines and in door-open position in broken lines;

Fig. 2 is a section taken through the hinge along the line 2—2 of Fig. 1; and

Fig. 3 is a section taken through the hinge along the line 3—3 of Fig. 1.

While the improved friction hinge has particular utility in an automobile door hinging arrangement as illustrated in Fig. 1, it is also useful in many other applications. In an automobile door hinging arrangement, it is often desirable to provide some degree of friction in the hinge in order to prevent the door from being swung open too forcefully and also to prevent the door from closing too readily in the event the automobile is not on a perfectly level surface. Also, it is desirable to readily adjust the degree of friction in the hinge so that the same hinge may be used with different sized doors and under different conditions of desired operation. The novel hinge which is disclosed and claimed in this application has these desirable features and, at the same time, is simple and cheap to construct.

Referring now to the drawings, 10 represents a body pillar in an automobile and 12 represents an automobile door which is hingedly mounted on the body pillar 10. Usually two hinges are used to hang each door, the hinges being spaced vertically from each other. The hinge which is not shown in the drawings may or may not incorporate the novel friction arrangement, as desired. The hinge consists of two primary elements, the first being a conventional type of hinge box 14 which is mounted in the body pillar, and the second being a hinge strap 26. The hinge box 14 has opposite walls 16 and 18 connected by a web 20 which is mounted by bolts 22 on the body pillar 10. The door 12 is secured by screws 24 to the gooseneck hinge strap 26 which is of conventional and well-known construction. A hinge pin 28 pivotally mounts the hinge strap 26 on the hinge box 16 for swinging movement between the opposite walls 16 and 18 of the hinge box 14 between door closed and door open positions.

In order to provide a desired degree of friction in the swinging movement of the hinge strap, a friction assembly is connected between the hinge box and the hinge strap at each opposite edge of the hinge strap. Since each of these friction assemblies is similar to the other, only one will be described in detail and similar parts in the other assembly will be designated by similar reference characters with the addition of a prime ('). Each assembly comprises an arcuate strip member designated generally as 32 which is secured at one end to a wall of the hinge box and which extends adjacent the hinge strap throughout substantially the entire length of swinging movement of the strap and is adjustably clamped to the strap for slidable and frictional movement of the strap relative to the friction assembly.

The elongated strip member 32 is formed of three laminations, each being of substantially the same size and shape and being arcuate in form. There are two outer laminations of material having a low coefficient of friction, preferably nylon, and an inner lamination of strong rigid material, preferably steel. This construction is shown best in Figs. 2 and 3, where the strip 32 is seen to be formed of outer laminations 34 and 36 of nylon. Between these outer laminations, there is sandwiched an inner lamination of steel 38. The nylon laminations give the desired frictional characteristics and the inner steel lamination provides necessary strength. The laminations are formed into a unitary subassembly by a plurality of rivets 40. The laminated assembly is mounted on the inner surface of the hinge box wall 16 by a pair of rivets 42 and the strip is formed as an arc having the hinge pin 28 as its center so that the same portion of the edge of the hinge strap passes by the stationary strip during swinging movement of the hinge strap between open and closed positions.

A clamp 44 is mounted on the edge of the hinge strap by screws 46 which are tapped into threaded apertures in the edge of the hinge strap. The degree of friction may be adjusted by turning one or both of these screws. As seen best in Fig. 1, one of the screws 46 is located outside the area of the hinge box wall 16 when the door is closed so that it is readily accessible by a tool which may be inserted into the body pillar 10 when the door is closed. As seen in Fig. 2, the hinge box wall is provided with an opening 48 opposite the other screw when the door is in closed position to provide for accessibility to this screw.

Since the degree of friction may be readily adjusted, the same hinge structure may be used with doors which are of different sizes and weights. Furthermore, the hinge can be easily adjusted after assembly to provide the desired degree of friction, simply by turning some or all the screws 46, 46'.

While I have shown and described one embodiment of my invention, it is capable of many modifications. Changes, therefore, in the construction and arrangement may be made without departing from the spirit and scope of the invention as set forth in the appended claims.

What is claimed is:

1. A friction hinge, comprising in combination, a first hinge member comprising a hinge box having opposite walls; a second hinge member comprising a hinge strap; means pivotally connecting said hinge strap to said hinge box for swinging movement between said walls; an arcuate elongated strip member secured at one end to one of said walls at a location spaced from said pivotal connecting means and extending adjacent an edge portion of said hinge strap throughout substantially the entire length of the path of swinging movement of said edge portion, said strip member being formed on an arc having said pivotal connecting means as its center; and adjustable clamp means slidably and frictionally securing said strip to said hinge strap.

2. Apparatus of the character claimed in claim 1, wherein said strip member comprises outer laminations of nylon and an inner lamination of steel.

3. Apparatus of the character claimed in claim 1, including a strip member mounted on each of said walls and clamp means securing each strip member to a respective edge of said hinge strap.

4. In combination in an automobile having a body and a door, a first hinge member comprising a hinge box mounted on said body, said hinge box being formed with parallel opposite walls; a second hinge member comprising a hinge strap mounted on said door; means pivotally connecting said hinge strap to said hinge box for swinging movement between said walls; an arcuate elongated strip comprising outer laminations of nylon and an inner lamination of steel, said strip being secured at one end to one of said walls at a location spaced from said pivotal connecting means and extending adjacent an edge portion of said hinge strap throughout substantially the entire length of the path of swinging movement of said edge portion; and adjustable clamp means slidably and frictionally securing said strip to said second hinge member.

References Cited in the file of this patent

UNITED STATES PATENTS

| | | |
|---|---|---|
| 1,791,690 | Stevens | Feb. 10, 1931 |
| 1,867,346 | Bittorf | July 12, 1932 |
| 1,905,858 | Hamilton | Apr. 25, 1933 |